United States Patent Office 3,839,360
Patented Oct. 1, 1974

3,839,360
N-(1-METHYL-4-PERHYDROAZEPINO-2-BUTYNYL) SUCCINIMIDE
Johan Richard Dahlbom, Sodertalje, Bo Lennart Karlen, Skarholmen, and Ake Roland Lindquist, Stockholm, Sweden, assignors to Astro Lakemedel Aktiebolag, Sodertalje, Sweden
No Drawing. Continuation-in-part of abandoned application Ser. No. 92,873, Nov. 25, 1970. This application Jan. 26, 1973, Ser. No. 327,133
Claims priority, application Sweden, Dec. 2, 1969, 16,531/69
Int. Cl. C07d 57/00
U.S. Cl. 260—326.5 FM     2 Claims

ABSTRACT OF THE DISCLOSURE

A compound, i.e. N - (1-methyl-4-perhydroazepino-2-butynyl) succinimide, of the formula

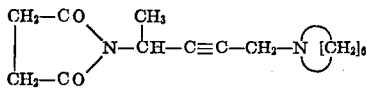

and the physiologically acceptable salts thereof, a process for their preparation, pharmaceutical preparations containing the compound or its salts and the use thereof in the treatment of tremors appearing in connection with Parkinson's disease and of tremors caused by similar diseases.

---

This application is a continuation-in-part of U.S. Ser. No. 92,873, filed Nov. 25, 1970, now abandoned.

The present invention relates to the compound represented by the formula

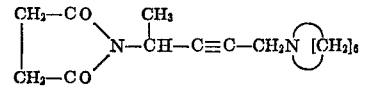

and its therapeutically acceptable salts. The name of this compound is N-(1-methyl-4-perhydroazepino-2-butynyl) succinimide.

For some years N - (4-pyrrolidino-2-butynyl)-pyrrolidone (oxotremorine) has been used to induce tremors and spasticity in several species of laboratory animals.

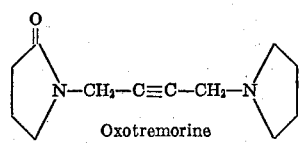

Oxotremorine

It induces violent generalized tremors, spasticity, hypokinesia and parasympathomimetic effects immediately after injection by intravenous routes and thus produces both central and peripheral cholinergic reactions.

A number of conventional drugs are known, such as atropine and caramiphen which will antagonize the oxotremorine-induced tremor. However, these drugs have the side effect of antagonizing the peripheral cholinergic effects of oxotremorine.

Other chemical compounds also exhibit some antagonism towards oxotremorine-induced tremor. For example, N-(1-methyl-4-pyrrolidino-2-butynyl) succinimide, N-(1-methyl-4-piperidino-2-butynyl) succinimide; and (dioxo-2,5 - pyrrolidino-1)-1-(perhydroazepino-1)-4-butyne-2 all exhibit varying degrees of activity as oxotremorine antagonists. The compound N - (1 - methyl-4-piperidino-2-butynyl)-succinimide is described in Example 10 of Dahlbom et al. U.S. Pat. No. 3,444,171 whereas (dioxo-2,5-pyrrolidino - 1)-1-perhydroazepino-1)-4-butyne-2 is described in Ber et al. U.S. Pat. No. 3,472,868.

It has been found that the compound of the present invention, i.e., N-(1-methyl-4-perhydroazepino-2-butynyl) succinimide, possesses a much greater selective potency for the central nervous system than either N-(1-methyl-4-piperidino-2-butynyl) succinimide or the unstable dioxo-2,5 - pyrrolidino - 1)-1-(perhydroazepino-1)-4-butyne-2. The compound of the present invention has a greater superiority as an oral medication than N-(1-methyl-4-pyrrolidino-2-butynyl) succinimide.

In order to obtain a central anti-cholinergic effect, it is necessary that the compound of the present invention be capable of penetrating into the brain. Accordingly, when used as an oxotremorine antagonist, the compound should preferably be in the free base form. It will be obvious to those skilled in the art, however, that in the preparation of the compound it may be convenient to prepare the non-toxic addition salts to simplify steps such as fractional crystallization. Accordingly, it will be understood that the typical addition salts are included within the present invention. Such salts include, but are not limited to hydrohalides, especially hydrochloric and hydrobromic acid, sulfuric acid, phosphoric acid, acetic acid, tartaric acid, citric acid and succinic acid. Of the foregoing, the hydrochloric and hydrobromic acids are preferred because of their ready availability. Manifestly, many other physiologically acceptable salts will be obvious to those skilled in the art, and all such salts may be employed in the present invention.

As is well known in the art, the tremormimetic effect of oxotremorine has been proposed as a pharmacological model of Parkinson's disease. The fact that the compound of the present invention has a high specificity in antagonizing the tremoromimetic effect of oxotremorine suggests, therefore, that it may also be useful in the treatment of Parkinson's disease.

The following examples will further illustrate the invention and the properties of the invention without, however, limiting it thereto.

EXAMPLE 1

Preparation of N-(1-methyl-4-perhydroazepino-2-butynyl) Succinimide

A mixture of N-(1-methyl-2-propynyl) succinimide (0.1 mole), paraformaldehyde (0.12 mole), perhydroazepine (cyclohexamethylene-imine) (0.11 mole), and cuprous chloride (0.2 g) in dioxane (20 ml.) was refluxed for one hour. After cooling, 100 ml. of water was added and the mixture was acidified with 5 M HCl and extracted with 50 ml. of ether. The aqueous phase was made alkaline with 1 M $Na_2CO_3$ under cooling and extracted with 6 50-ml. portions of $CHCl_3$. The extract was dried over $Na_2SO_4$, and the solvent was evaporated under vacuum. The oily reaction product was purified by chromatography on a $Al_2O_3$-column and was further characterized as the oxalate. This salt melted at 113–115° C. after recrystallization from ethanol-ether. In the following Examples the pharmalogical properties of the compound of the claimed invention is compared to certain related compounds which were mentioned above. In each of the Examples the compounds have been given the following numbers:

| Compound Name | Compound No. |
|---|---|
| N - (1 - methyl-4-perhydroazepino-2-butynyl)-succinimide [1] | I |
| N-(1-methyl-4-pyrrolidino-2-butynyl)-succinimide | II |
| N-(1-methyl-4-piperidino-2-butynyl)-succinimide [2] | III |
| (Dioxo - 2,5-pyrrolidino-1)-1-(perhydroazepino-1)-4-butyne-2 [3] | IV |

[1] Compound of the present invention.
[2] Disclosed in Example 10 of Dahlbom et al. U.S. Pat. No. 3,44,171.
[3] Disclosed in col. 1 lines 38–46 of Ber et al. U.S. Pat. No. 3,472,868.

Examples 2–7: Tests of superiority of compound I over compounds II and III

EXAMPLE 2

Tests of Antitremor Dose in Mice for Compounds I, II and III

The antiremor dose in mice was determined by using the test procedure set forth in Example 22 of the Dahlbom et al. U.S. Pat. 3,444,171. The concentration of the test drug needed to reduce the oxotremorine induced tremor index one unit as described in that patent was determined. Basically the procedure comprises giving groups of five male mice, each weighing 18–22 grams, intraperitoneal injections of the test compounds in a dose not exceeding 10 mg./kg. in a series of doses increasing by a factor of 2 after each step. Oxotremorine was then injected intravenously at a dose of 150 µg./kg. and after 15–20 minutes the intensity of the tremor was graded visually according to the scale given in the Dahlbom et al. patent. Tremors which were continuous and incapacitating were given 4 points. Tremors which were intermittent, but which occupied most of the time were assigned 3 points. Tremors which were intermittent and occasional were given 2 points. Tremors not occurring spontaneously but which could be provoked by restraint were designated as 1 point tremors, and in cases where no tremors were observed, 0 was assigned. The results were averaged of each group of five mice. The dose of each compound required to control the average oxotremorine-induced tremor to a level of 3 was ascertained. The experiment was then repeated at a higher dose sufficient to reduce the tremor index one unit so that a 2 point tremor was observed. The anti-tremor dose for each compound was the difference between the level at which a 2.0 tremor was observed and the level at which a 3.0 tremor was observed.

Table I sets forth the anti-tremor dose in the mice for each of the test compounds needed to give a reduction in the tremor index of one unit:

TABLE I

| Test Compound No. | Anti-tremor Dose (mg./kg.) |
| --- | --- |
| I | 0.03 |
| II | 0.21 |
| III | 0.66 |

EXAMPLE 3

Test of Pharmacological Action of I and II on Isolated Guinea Pig Ileum

Extensive experimentation supports the assumption that oxotremorine derivatives act at the muscarinic receptor and at the postganglionic cholinergic cites of the autonomic nervous system (i.e. isolated guinea pig ileum). Tests conducted, as described below, show that the potency or affinity for the muscarinic receptor using isolated guinea pig ileum of Compound I is greater than that of Compound II.

Acetylcholine antagonism was measured on isolated guinea pig ileal strips suspended in oxygenated tyrodes solution. Contractions of the ileal strip were recorded isotonically at 1 g. tension using a Harvard Apparatus Smooth Muscle Transducer and a potentiometric recorder. The tissue preparations were allowed to equilibrate 30 minutes before the amount of contraction was recorded.

A series of dose-response curves was obtained for each test compound. One does response-curve (control curve) was obtained using acetylcholine alone, all others were measured in the presence of varying amounts of a test compound. In the presence of increasing amounts of test compound, the amount of the acetylcholine required to produce a response in the tissue preparation was also increased. From this data, the relation was determined between the amount of test compound and the amount of acetylcholine required to produce a 50% response in the tissue preparation. It was found that the dose of acetylcholine needed to give a 50% response in the tissue preparation increased in nearly direct proportion to the amount of test compound present.

This procedure was used to determine the amount of test compound which must be administered to also give a 50% response if twice the acetylcholine concentration of the control is used. This is a convenient index of the relative activity of the compounds tested. Table II summarizes the results:

TABLE II

| Test Compound No. | Concentration of Test Cpd. Requiring Doubling of Acetylcholine Dose (moles/liter) |
| --- | --- |
| I | $1.3 \times 10^{-7}$ |
| II | $13 \times 10^{-7}$ |

This test indicates that Compound I has a much greater potency as an acetylcholine antagonist at the muscarinic receptors of guinea pig ileal strips than Compound II.

EXAMPLE 4

Comparison of Tremor Activity Blockage in Mice After Intraperitoneal Injection of I and II Antagonism or potentiation of tremor induced by oxotremorine was estimated by determining the median effective dose of oxotremorine necessary to produce a grade 2 tremor as defined in Dahlbom U.S. Pat. 3,444,171 at column 12, lines 10–18. The up-down method for small samples described by Dixon, *Journal of the American Statistical Association*, Vol. 60, pages 967–978 (1965), was employed.

On the basis of preliminary data, four arithmetically spaced doses, including zero, of the test compounds were chosen as likely to encompass the dose range effective to control oxotremorine-induced tremors. Tests were carried out on groups of 6 female mice, each weighing between 22 and 26 grams. Each animal was first injected (i.p.) with the pre-selected dose of test compound. Ten minutes later the animal was injected (i.v.) with oxotremorine, and three minutes after oxotremorine injection, the tremor induced was graded. The median effective dose of oxotremorine was determined in the following manner:

A logarithmitic series of doses of oxotremorine were tested with a spacing of 0.1 on the $\log_{10}$ scale. The initial animal in each group of six animals was injected with a dose selected at random. The tremor provoked by oxotremorine was graded as described in Example 2. Animals with a grade 2 tremor or greater were designated as positive; those in which the tremor induced was less were designated negative. If the initial dose of oxotremorine provoked a positive response, the next animal within that group was treated at the next lower dose. If a negative response was obtained, the next higher dose was used. This procedure was conducted as described by Dixon, and, on the basis thereof, the median effective dose of oxotremorine required to provoke a positive tremor response was estimated for each dose of oxotremorine antagonist.

The median effective dose of oxotremorine was correlated with the corresponding dose of the test compound. If the data indicated deviation from linearity a fifth dose of test compound was tested in the region of the dose of oxotremorine antagonist which would double the median effective dose of oxotremorine relative to the median effective dose of oxotremorine in the absence of an compounds which increased the median effective doses of oxotremorine from 2 to 10 times. From the data, an estimate was made using weighted regression analysis of the dose of test compound which doubles the median effective dose of oxotremorine needed to produce the same tremor response shown when no test compound is present.

Table III gives the dose of the test compounds administered intraperitoneally which required a doubling of the oxotremorine dose to produce the same degree of tremor:

TABLE III

| Test Compound No. | Dose of Antagonists Required to Double the Median Effective Dose of Oxotremorine (mole/kg.) |
|---|---|
| I | $4.5 \times 10^{-7}$ |
| II | $7.0 \times 10^{-7}$ |

Table III indicates the *in vivo* ability of the test compounds when administered intraperitoneally to antogonize oxotremorine's action at the cholinergic receptors. Compound I has a slightly greater potency than Compound II. Both appear to exhibit good actiivty for the central nervous system.

EXAMPLE 5

Comparison of Mydriasis at Dosage Levels of I and II Required to Increase Oxotremorine Dose $5\times$ The effects on pupil size were determined in order to evaluate the potency of the test compounds at a peripheral muscarinic receptor. The percent mydriasis was determined (graphically) at doses of test compound that require five times the control oxotremorine dose to produce tremor. The pupil size of the mice was measured by means of a binocular dissecting microscope with a micrometer disc in one eye piece. Pupil sizes were expressed in micrometer units. The light source is kept constant by means of a Nicolus illuminator (Bausch and Lomb Catalog No. 31–33–53) with an adjustable intensity transformer base (set for highest intensity) and a 6.5 volt, 2.75 amp. prefocus lamp with a G.E. 1630 bulb. The overhead room lights were kept on. It was found that the compound of the present invention, i.e., Compound I, produces only 18% mydriasis, whereas Compound II gave 50% mydriasis. (100% mydriasis equals the maximum mydriasis produced by atropine).

Using pupillary response as a measure of the peripheral muscarinic actiivty, the degree of undesirable blockage at the periphery at a comparably therapeutic dose of the test compounds (as measured by the dose in Table III) would be indicated by the amount of mydriasis. It was unexpectedly found that Compound I, while maintaining a good level of central nervous system potency, has much better selectivity than Compound II and has an unexpectedly low mydriatic effect.

EXAMPLE 6

Comparison of Tremor Activity Blockage in Mice of I and II When Administered by the Oral Route The procedure set forth in Example 4 above was followed with the exception that instead of administering I and II via the intraperitoneal route, these test compounds were administered orally. Table IV sets forth the results that were obtained:

TABLE IV

| Test Compound No. | Dose Required to Double The $ED_{50}$ of Oxotremorine (moles/kg.) |
|---|---|
| I | $7.0 \times 10^{-7}$ |
| II | $22 \times 10^{-7}$ |

The greater potency of Compound II towards the peripheral nervous system, as reflected in the mydriatic effect, indicates greater movement through the body, and one would therefore except Compound II to have a greater potency than Compound I if both were administered orally. Unexpectedly, the converse was found to be true, as shown in Table IV.

EXAMPLE 7

Comparison of Anti-tremor Blocking Action of I and IV

The test procedure Example 4 above was repeated for test Compounds I and IV. The dose requiring a doubling of oxotremorine to give a like tremor response for Compound I was only $4.5 \times 10^{-7}$ moles/kg. whereas the corresponding dose for Compound IV was $30 \times 10^{-7}$ moles/kg. This value for Compound IV was only approximate since that compound is unstable in solution. The Compound I was stable in solution.

EXAMPLE 8

The optically active isomers of the present invention can be prepared from the respective optical isomers of 3-amino-1-butyne:

Racemic 3-amino-1-butyne (27.6 g., 0.40 mole) was added in small portions to a solution of L-(+)-tartaric acid (60.0 g., 0.40 mole), $[\alpha]_D^{20}$ $+14.0°$ (c. 10, H$_2$O), in methanol 200 ml.). The solution was kept at room temperature for 2 hours and the solid formed was collected and dried to give the diastereomeric 3-amino-1-butyne (+)-tartarate (85 g.), m.p. 116–120° C. The resolution of the diastereomeric forms required five crystallizations from aqueous 60% solutions and afforded 3.1 g. of the resolved 3-amino-1-butyne (+)-tartrate, m.p. 158–160°. The identity of the compound was confirmed by carbon, hydrogen and nitrogen analyses.

Polarimetric control of the recrystallization could not be performed directly on the amine tartrate since the diastereomers of 3-amino-1-butyne tartrate differ only slightly in rotation. Therefore, the determination of the specific rotation was performed on the benzoyl derivative which was prepared as follows: 3-amino-1-butyne (+)-tartrate (0.20 g., 0.0009 mole), benzoyl chloride (0.20 g., 0.0014 mole) and NaOH 1 M (5 ml.) was shaken at room temperature for 20 minutes. The mixture was extracted with ether (2× 10 ml.) and the dried (anhydrous Na$_2$SO$_4$) ethereal extract was evaporated *in vacuo* to give the benzamide (about 0.1 g.) which was recrystallized from benzene petroleum ether, m.p. 89–90° C., $[\alpha]_D^{20}$ $-42.9°$ (c. 0.8, EtOH). Identification of the compound was confirmed by analysis of carbon, hydrogen and nitrogen.

From the combined mother liquors of the above resolution the amine was liberated by addition of aqueous 50% NaOH. The basic solution was extracted with ether (6× 25 ml.) and the amine (−)-tartrate was precipitated from the ethereal extract by addition of a methanolic 25% solution of D-(−)-tartaric acid $[\alpha]_D^{20}$ $-14.0°$ (c. 10, H$_2$O). The resolution of the (−)-tartrate (44 g.) was carried out as above with the (+)-tartrate affording 2.1 g. of resolved 3-amino-1-butyne (−)-tartrate. The benzamide was prepared as described above, m.p. 88–90° C., $[\alpha]_D^{20}$ $+42.3°$ (c. 0.9, EtOH).

3-amino-1-butyne tartrate [1.0 g., 0.0048 mole, $[\alpha]_D^{20}$ $+40.1°$ (c. 0.9, EtOH) and $[\alpha]_D^{20}$ $-40.7°$ (c. 0.9, EtOH), respectively for the corresponding benzamides] was dissolved in water (2 ml.). Sufficient 5 M NaOH was added to raise the pH to 9, and the solution was extracted with ether (5× 5 ml.). Succinic anhydride (0.48 g., 0.0048 mole) dissolved in acetone (10 ml.) was added to the ether extract and the mixture refluxed for 4 hours. The solvent was then removed *in vacuo* and the residual solid recrystallized from acetone. (R)-(+)-N-(1-methyl-2-propynyl) succinamic acid: m.p. 118–120° C., yield 61%, $[\alpha]_D^{20}$ $+88.7°$ (c. 0.8, EtOH). (S)-(−)-N-(1-methyl-2-propynylsuccinamic acid: m.p. 119–121° C., yield 58%, $[\alpha]_D^{20}$ $-90.6°$ (c. 0.9, EtOH). The IR spectra given by the antipodes were consistent with the spectrum of the racemic compound.

Optically active N-(1-methyl-2-propynyl) succinamic acid of the specific rotation given above (0.8 g., 0.0047 mole), anhydrous NaOAc (0.5 g.) and acetic anhydride (4 ml.) was refluxed for 1 hr. After cooling water (8 ml.)

was added, the mixture stirred at room temperature for 2 hours and then neutralized with solid $K_2CO_3$ under vigorous stirring. After extraction with ether (6× 5 ml.) the dried (anhydrous $Na_2SO_4$) ethereal extract was evaporated *in vacuo*. To the residual oil perhydroazepine (0.0047 mole), paraformaldehyde (0.16 g., 0.0053 mole), cuprous chloride (0.02 g.), dioxane (4 ml.), and 0.52 ml. (.0097 Mol) glacial acetic were added. A Mannich reaction was then performed and the product worked up as described in *J. Med. Chem. 13*, 651 (1970). The results for the perchlorate salt of the compound of the present invention are: (R)-(+)-N-(1-methyl 4-perhydroazepino-2-butynyl) succinimide perchlorate: m.p. 191–192° C., yield 52%, $[\alpha]_D^{20}$ +37.5° (c. 1.0, EtOH). Data for the (S)-(−)-antipode: m.p. 191–192° C., yield 49%, $[\alpha]_D^{20}$ 38.0° (c. 0.9, EtOH). The antipodes showed essentially the same IR-spectrum as the racemic compound.

EXAMPLE 9

The racemic (±), (+) form and (−) of the compound of the present invention (i.e., Compound I) were tested. The first test measured antagonism of oxotremorine induced tremors in the mouse by the up-down method. A description of the test procedure employed is given in Example 4. The results are:

| Compound | Dose to Double the $ED_{50}$ of Oxotremorine (moles/kg.) |
|---|---|
| I (±) | $1.3 \times 10^{-6}$ |
| I (+) | $6.5 \times 10^{-7}$ |
| I (−) | ------- |

Another test was performed to measure antagonism of acetylcholine induced contraction of isolated guinea pig ileum. The description of this test procedure is given Example 3, above. The results are:

| Compound | Dose (moles/liter) |
|---|---|
| I (±) | $2.4 \times 10^{-7}$ |
| I (+) | $1.45 \times 10^{-7}$ |
| I (−) | $2.0 \times 10^{-5}$ |

A test of the mydriatic effect in the mouse at the reported antitremor dose (100% equals maximum mydriasis produced by atropine) was conducted. The dose needed to produce an 18% mydriasis in mice was also determined (i.e., 18% of atropine maximum which approximately equals a 100% increase in initial pupil size). The equipment used in Example 5 was also employed in these tests of mydriatic effect.

Mydriatic Effect at Antitremor Dose Given in Example 8

| Compound | Percent Mydriasis |
|---|---|
| I (±) | 2.5 |
| I (+) | 2.0 |

Dose Needed To Produce 18% Mydriasis

| Compound I | Dose (moles/kg.) |
|---|---|
| (±) | $3.6 \times 10^{-6}$ |
| (+) | $2.5 \times 10^{-6}$ |

It becomes apparent that the (+)-form of Compound I possesses a greater antitremor effect, a greater antagonism of acetylcholine induced contraction of isolated guinea pig ileum and a greater mydriatic effect than either the (−) form or the racemate.

The foregoing is intended to be illustrative of a number of embodiments of the claimed invention and is not to be taken as limiting. The scope of the invention is defined in the claims which follow.

We claim:

1. N-(1-methyl-4-perhydroazepino-2-butynyl) succinimide and the physiologically acceptable salts thereof.

2. The compound according to claim 1 in its optically active (+) dextrorotatory form.

References Cited
UNITED STATES PATENTS 3,472,868  10/1969  Ber et al. ____ 260—326.5 FM X
3,444,171  5/1969  Dahlbom et al. __ 260—326.5 FM X JOSEPH A. NARCAVAGE, Primary Examiner U.S. Cl. X.R.

260—239 B, 239 BF; 424—274

PO-1050
(5/69)

UNITED STATES PATENT OFFICE
CERTIFICATE OF CORRECTION

Patent No. __3,839,360__    Dated __October 1, 1974__

Inventor(s) __Johan Richard Dahlbom, Bo Lennart Karlen & Ake Roland Lindquist__

It is certified that error appears in the above-identified patent and that said Letters Patent are hereby corrected as shown below:

In the caption, change the name of the assignee, from "Astro" to -- Astra --;

Col. 5, line 14, "antogonize" should read -- antagonize --;

Col. 5, line 17, "actiivty" should read -- activity --;

Col. 5, line 43, "actiivty" should read -- activity --;

Signed and sealed this 11th day of March 1975.

(SEAL)
Attest:

RUTH C. MASON
Attesting Officer

C. MARSHALL DANN
Commissioner of Patents
and Trademarks